(12) United States Patent
Zhang et al.

(10) Patent No.: US 8,850,453 B1
(45) Date of Patent: Sep. 30, 2014

(54) TECHNIQUES FOR EVENT FILTERING

(75) Inventors: Hongzhen Zhang, Southborough, MA (US); Bruce R. Rabe, Dedham, MA (US); Scott E. Joyce, Foxboro, MA (US); Pauline Chen, North Grafton, MA (US); Neil F. Schutzman, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 538 days.

(21) Appl. No.: 12/924,571

(22) Filed: Sep. 30, 2010

(51) Int. Cl.
*G06F 3/00* (2006.01)

(52) U.S. Cl.
USPC ........................................... 719/313

(58) Field of Classification Search
None
See application file for complete search history.

(56) References Cited

U.S. PATENT DOCUMENTS

| | | | |
|---|---|---|---|
| 7,457,914 B2 | 11/2008 | Cordella et al. | |
| 2002/0037750 A1* | 3/2002 | Hussain et al. | 455/564 |
| 2006/0026141 A1* | 2/2006 | Brubacher et al. | 707/3 |
| 2006/0195591 A1* | 8/2006 | Kim et al. | 709/227 |
| 2006/0288037 A1* | 12/2006 | Sundararajan et al. | 707/102 |
| 2011/0012748 A1* | 1/2011 | Oguchi et al. | 340/825 |
| 2011/0173621 A1* | 7/2011 | Meijer et al. | 718/102 |

* cited by examiner

*Primary Examiner* — H S Sough
*Assistant Examiner* — Carina Yun
(74) *Attorney, Agent, or Firm* — Muirhead and Saturnelli, LLC

(57) ABSTRACT

Described are techniques for event notification. A first notification about a first event is received. A timer is set to an amount of time. Processing waits until an occurrence of either receiving a second notification of a second event or expiration of said timer indicating that the amount of time has lapsed. It is determined whether the amount of time has lapsed or whether the second notification has been received. If the expiration time has lapsed, notification of the first event is provided, and otherwise, if the second notification has been received prior to the amount of time lapsing, the timer is reset and processing waits for an occurrence of either receiving a next notification of an event or expiration of the timer indicating that the amount of time has lapsed.

16 Claims, 7 Drawing Sheets

TECHNIQUES FOR EVENT FILTERING

BACKGROUND

1. Technical Field

This application generally relates to event handling, and more particularly to event notification.

2. Description of Related Art

A computer system may have an application executing thereon with a user interface (UI) such as a graphical user interface (GUI). Each time a user interacts with the GUI such as, for example, by making a menu selection or providing a data input value, an event may be generated. In response to these events, the GUI may be appropriately updated. If such events are generated at a high rate, a system may not be able to process the generated events at a sufficient rate and may not update the GUI quickly enough. As a result, the user may experience a delay in updates to the GUI as well as a lower response time while the system is consuming resources to process each of the events.

SUMMARY OF THE INVENTION

In accordance with one aspect of the invention is a method for event notification comprising; receiving a first notification about a first event; setting a timer to an amount of time; waiting until an occurrence of either receiving a second notification of a second event or expiration of said timer indicating that said amount of time has lapsed; and determining whether said time amount of time has lapsed or whether said second notification has been received, wherein if said expiration time has lapsed, notification of said first event is provided, and otherwise, if said second notification has been received prior to said amount of time lapsing, resetting said timer and waiting for an occurrence of either receiving a next notification of an event or expiration of said timer indicating that said amount of time has lapsed. A plurality of notifications about a plurality of corresponding events may be received and at least said amount of time has lapsed since receiving a last one of said plurality of notifications. The method may also include providing notification about said last one of said plurality of notifications and not providing notification about any others of said plurality of notifications. The first event and the second event may be associated with the same subscription criteria. The subscription criteria may include a category identifying an event category. The subscription criteria may include a plurality of subcategories for said category. A publisher may publish said first notification and said second notification. The first event may have a first category and notification of said first event may be provided to a subscriber previously registered to receive notifications about events of said first category. The first event may have a subcategory. Notification of said first event may be provided to said subscriber previously registered to receive notifications about events having said first category and said subcategory.

In accordance with another aspect of the invention is a system comprising: a publisher of event notifications; a message service that receives said event notifications from said publisher; a filtering service which receives said event notifications from said message service, said filtering service having a timer indicating an amount of time; a subscriber which receives a portion of said event notifications from said filtering service in accordance with subscription criteria, said filtering service comprising code stored in a memory, the memory comprising code stored thereon for: receiving a plurality of event notifications having said subscription criteria; determining that at least said amount of time has lapsed since receiving a last one of said plurality of event notifications and that said amount of time has not lapsed between any two consecutively received ones of said plurality of event notifications; and providing said last event notification to said subscriber and not providing any others of said plurality of event notifications to said subscriber. The subscription criteria may include a category indicating a category of events. The category may be associated with one or more subcategories and said subscription criteria includes one or more of said subcategories. The subscriber may subscribe to said filtering service and said filtering service may subscribe to said message service on behalf of said subscriber. The subscriber may subscribe to said filtering service and the subscriber may specify the subscription criteria identifying events about which said subscriber is to be notified. When the subscriber subscribes to said filtering service, said subscriber may specify the amount of time for said timer.

In accordance with another aspect of the invention is a method for event notification comprising; receiving a plurality of event notifications about a plurality of corresponding events; and sending a portion of said plurality of event notifications to a subscriber, wherein each event notification in said portion is followed by a time period during which no other event notifications have occurred, a second portion of said plurality of event notifications including all event notifications of said plurality of event notifications not sent to said subscriber, wherein each event notification in said second portion is followed by another one of said plurality of events within an amount of time indicated by said time period. Each event notification in said plurality may have an associated category and subcategory which matches subscription criteria of a subscriber. The time period may be specified in connection with a subscription registration or otherwise provided using a default value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
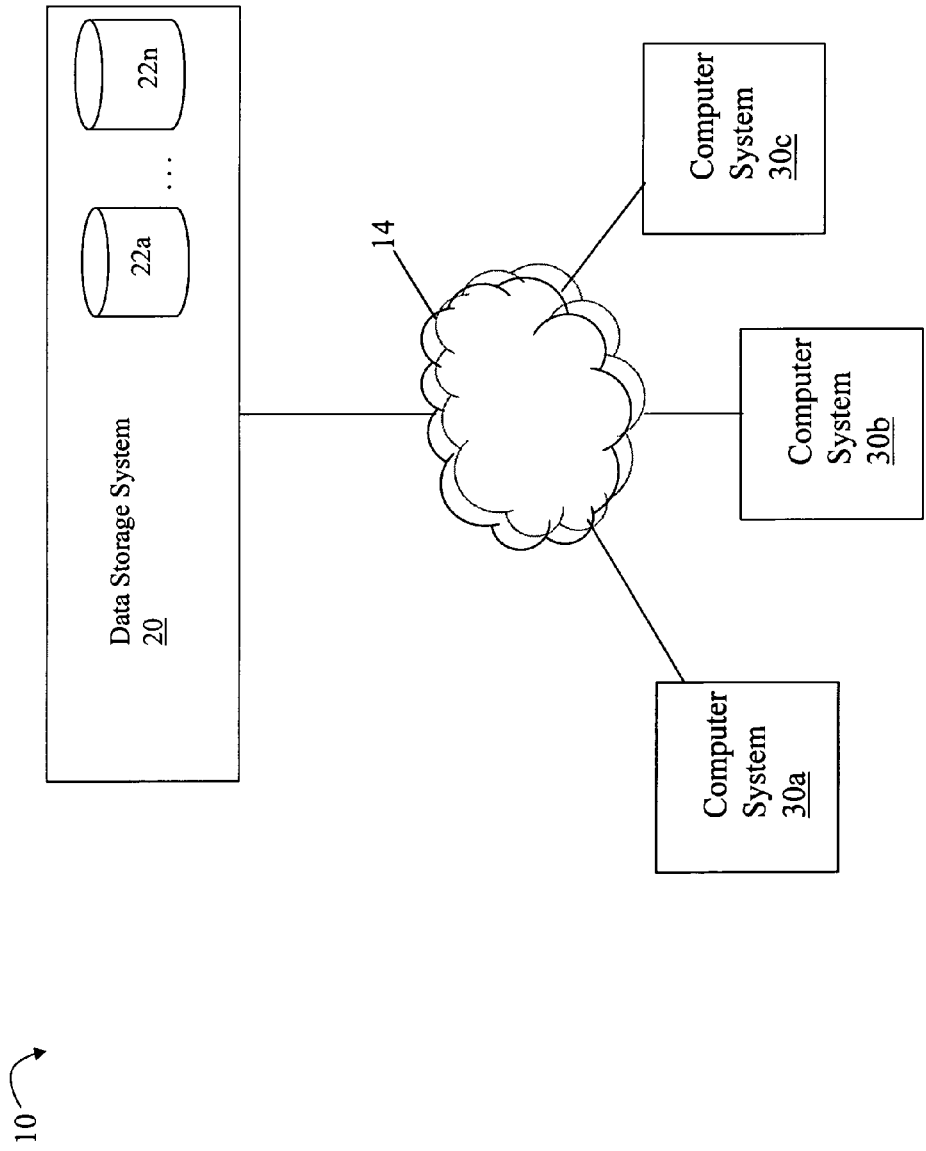
FIG. 1 is an example of an embodiment of a system that may utilize the techniques described herein.

Referring to FIG. 1, shown is an example of an embodiment of a computing environment that may be used in performing the techniques described herein. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are computer systems 30a-30c, data storage system 20, and a network 14. Each of the computers 30a-30b may be a standard, commercially-available computer or a special-purpose computer that may be used to execute one or more program modules. Described in more detail elsewhere herein are program modules that may be executed by computers 30a-30c in connection with facilitating filtered event notification. The computers 30a-30c may operate in a networked environment and communicate with other computers and components not shown in FIG. 1. The data storage system 20 may be a data storage array having a plurality of data storage devices 22 such as, for example disk drives, flash drives, and the like. The computers 30a-30c may communicate over network 14 to access data stored on devices of the data storage system 20. The data storage system 20 may be, for example, a data storage array of a vendor such as EMC Corporation of Hopkinton, Mass.

It will be appreciated by those skilled in the art that although components of the system of FIG. 1 are shown in the example as communicating in a networked environment, the components may communicate with each other and/or other components utilizing different communication mediums. For example, the components of FIG. 1 may communicate with each other and/or one or more components utilizing a network connection, and/or other type of link known in the art including, but not limited to, the Internet, an intranet, or other wireless and/or hardwired connection(s).

Although not illustrated in FIG. 1, each of the computers 30a-30c may include one or more processing units, memory, a network interface unit, storage, and the like. Depending on the configuration and type of computer, the memory thereof may be volatile (such as RAM), non-volatile (such as ROM, flash memory, etc.) or some combination of the two. The storage may include removable and/or non-removable storage for use with computer system including, but not limited to, USB devices, magnetic or optical disks, or tape. Such storage devices have associated computer-readable media that may be utilized by the computer and may include, for example, a hard disk or CD-ROM drive, that can be accessed by the computer. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer. Each of the computers may also contain communications connection(s) to facilitate communication with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art.

A computer system, such as 30a, may have an application with a user interface (UI) executing thereon. The UI may be a graphical user interface (GUI) which provides for display of one or more well known UI elements such as, for example, menus, tables, message boxes, radio buttons, and the like. Described in following paragraphs are techniques that may be used in connection with event notification with the UI. Although the following exemplary embodiment may be used in connection with a UI, it will be appreciated by those of ordinary skill in the art that the techniques herein are more generally applicable for use in connection with any type of event notification in any system.

Figure 2:
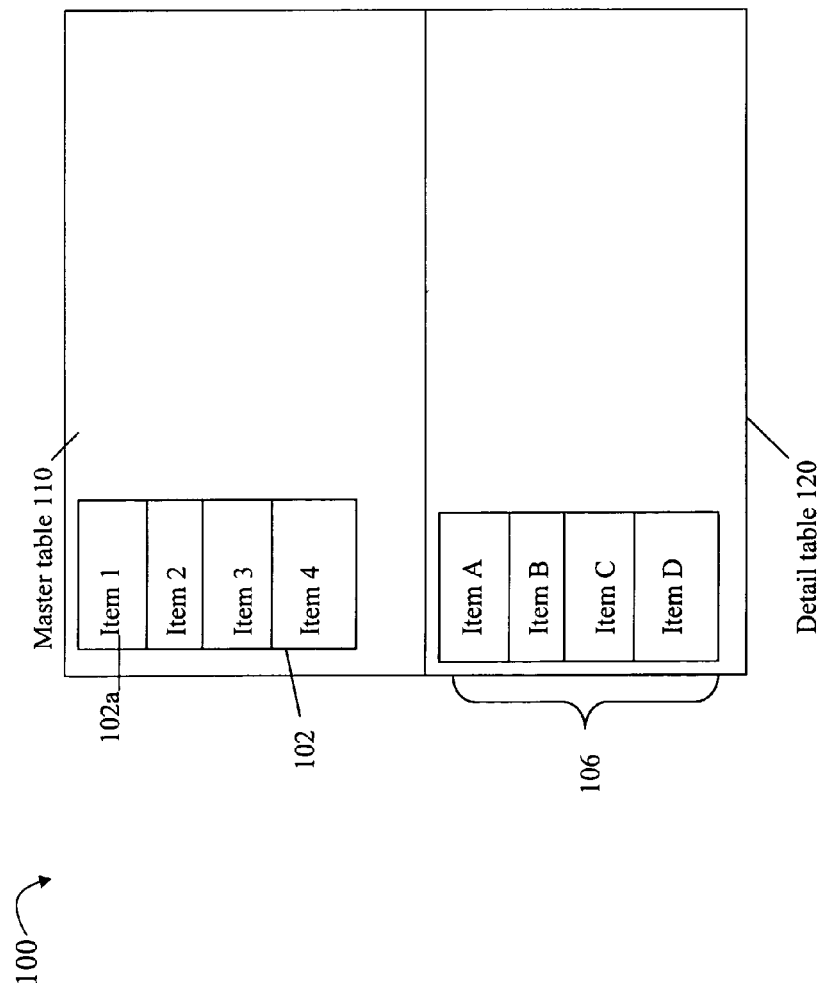
FIG. 2 is an example of information that may be displayed in a user interface in accordance with techniques.

Referring to FIG. 2, shown is an example of information that may be displayed in connection with the UI such as on a display device of a computer system. The example 100 includes a master table 110 and a detail table 120. Generally, the tables 110 and 120 may represent data on different portions of a UI display. A user may interact with the UI such as by manually making a selection 102a of item 1 from displayed information of 102. Such selection may be made, for example, using an input or selection device such as a mouse, keyboard, and the like. In response to the user selection 102a, a portion of the detail table 120 may be accordingly updated. For example, table 102 may represent a list of directories and selection of 102a may be a selection to display a list of files (represented as 106) in the selected directory. As another example, table 102 may be a list of data storage devices and selection of 102a may result in displaying properties or attributes (represented as 106) about the device such as storage capacity, RAID protection and the like. As yet another example, element 102a may be an input field for which a user specifies a value such as, for example, by entering a data value for a name using an input device. In response, information (e.g., address, age, and other personal information as represented by 106) about the person having the name may be retrieved from a database and displayed. The selection of the item 102a, or more generally any user interaction with the UI such as through an input device, may result in generation of an event. The detail table 120 may be appropriately updated in response to each such event in connection with the master table 110.

In connection with user interactions, a user may make multiple repeated selections from the master table 110 resulting in generation of corresponding events. If such events are generated at a high rate, a computer system which does not utilize the techniques described herein may not be able to process the generated events at a sufficient rate and accordingly may not update the detail table 120 in a timely manner. As a result in an embodiment which does not use the techniques herein, the user may experience a delay in updates to the GUI as well as a lower response time while the system is consuming resources to process each of the events. Typically, when a user makes such repeated selections at a fast rate, the most recent or latest event(s) are the ones that should be processed. The UI displayed as a result of earlier occurring similar events may be made obsolete by the UI displayed as a result of the more recent events.

What will now be described are techniques that may be used in an embodiment in connection with providing notification of events such as those generated as a result of user interactions with the UI described above. The techniques herein provide for filtering of event notifications based on a timer. In one embodiment as will be described below, a filtering service may receive notification of an event from a message service. The filtering service may set a timer indicating an amount of time representing an expiration time. The filtering service may provide notification of events to a subscriber. The filtering service delays providing the subscriber notification of the event until the timer expires (e.g., amount of time has lapsed). If the filtering service receives notification of another event prior to the timer expiring, the timer is again reset to the expiration time. The foregoing may be repeatedly performed until no new event notification is received by the filtering service for at least the amount of time indicated by the timer thereby allowing the timer to expire (e.g., the amount of time to lapse). Thus, the only event that is fired in such a sequence of consecutive events is the last event received that survives the entire timer duration. In one embodiment as described in more detail below, the techniques herein may be in the context of the publisher of event notifications and the subscriber which subscribes to receive notification of selected event occurrences. The publisher may send event notifications to a message service. In turn, the message service may send the notifications to a filtering service registered as a subscriber of the message service. The techniques herein may be used to filter notification of events as received by the filtering service from the message service. The filtering service may act as a proxy receiving notifications directly from the message service on behalf of the subscriber. The subscriber may be registered directly with the filtering service. The filtering service may perform event notification filtering in accordance with techniques herein so that the subscriber only receives notification from the filtering service about the last such event in the sequence. As described above, providing notification of the event is delayed until the timer has expired. In connection with the example of FIG. 2, the publisher of event notifications may be the master table and the subscriber of the event notifications may be the detail table.

Set forth in following paragraphs is a general discussion of processing that may be performed to filter out event notifications in accordance with techniques herein. Subsequently, an example is presented including components that may be used in one embodiment of the techniques herein with the detail table as the subscriber, the master table as the publisher, a message service receiving published event notifications from the publisher, and a filtering service which, as noted above, performs the event notification filtering techniques herein and receives published notifications directly from the message service on behalf of the subscriber.

Figure 3:
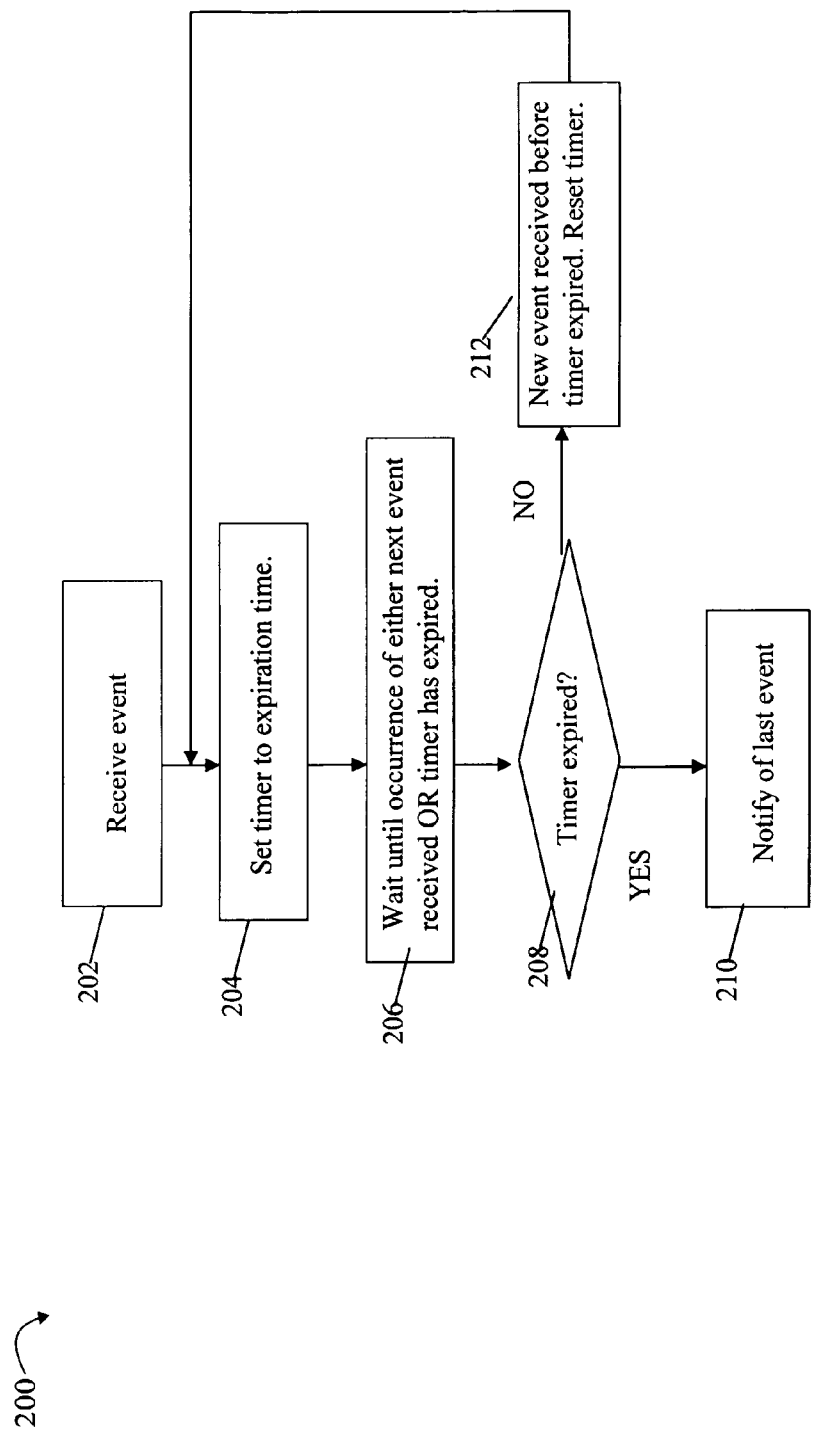
FIGS. 3 and 7 are flowcharts of processing steps that may be performed in an embodiment in accordance with techniques herein.

Referring to FIG. 3, shown is an example of processing as may be performed in an embodiment in accordance with techniques herein. The flowchart 200 outlines processing described above as may be performed in connection with providing filtering of event notifications such as by the filtering service. At step 202 notification of an event may be received, such as by the filtering service from the message service. At step 204, the timer is set to an amount of time that represents the expiration time. At step 206, processing waits until the earlier occurrence of either the next event notification or the timer has expired. Upon the occurrence of either another event notification being received or the timer expiring, control proceeds to step 208. At step 208, a determination is made as to whether the timer has expired. If step 208 evaluates to no, control proceeds to step 212 where it may be concluded that the new or next event notification was received, such as by the filtering service, before the timer had expired. Control proceeds to step 204 to reset the timer to the expiration time. If step 208 evaluates to yes indicating the timer has expired, control proceeds to step 210 to provide notification of the last or most recently received event. Thus, if there are 4 event notifications received by the filtering service where the temporal distance between any two consecutive event notifications is less than the expiration time (e.g. timer has not expired and expiration time has not lapsed) and the timer expires after receiving the last or fourth event in the series, processing of flowchart 200 results in filtering out notification of all events except for the last or fourth event.

Figure 4:
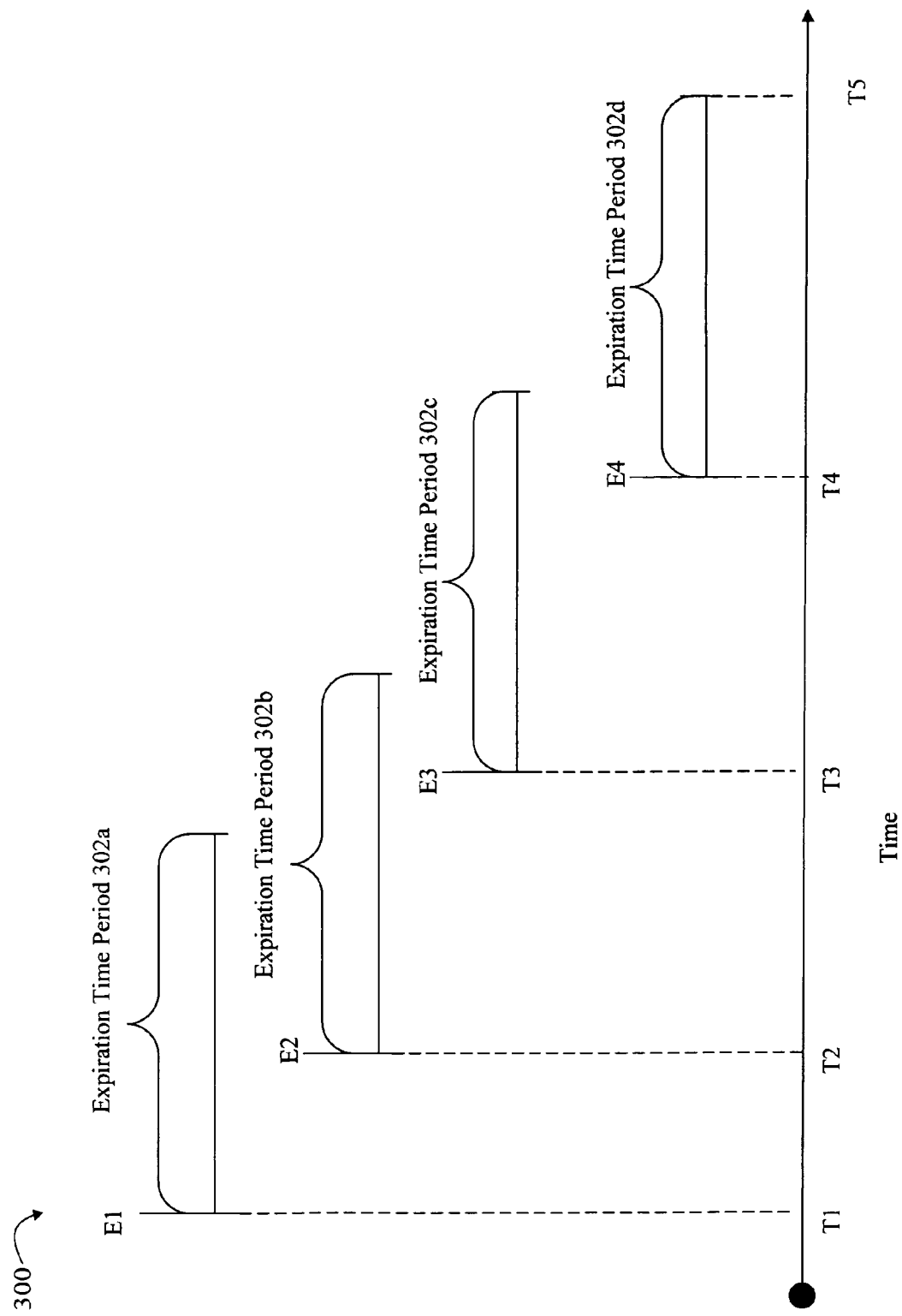
FIG. 4 is an example illustrating use of techniques herein for event notification filtering.

Referring to FIG. 4, shown is a graphical illustration of an example of the techniques herein. The example 300 illustrates times at which various events may be received. In the example 300, notifications regarding events E1, E2, E3 and E4 are received, respectively, at times T1, T2, T3 and T4. Elements 302a-d each represent the expiration time or amount of time to which the timer may be set upon receiving notification of an event. It should be noted that 302a-302d each denote a same amount of time although the amount of time may be configured in an embodiment. At time T1, notification of event E1 is received and the timer is set to the expiration time. At time T2, notification of event E2 is received. Since the amount of time indicated by 302a has not lapsed when notification of event E2 is received, the timer is again reset as indicated by 302b. At time T3, notification of event E3 is received and the timer is set to the expiration time. Since the amount of time indicated by 302b has not lapsed when notification of event E3 is received, the timer is again reset as indicated by 302c. At time T4, notification of event E4 is received. Since the amount of time indicated by 302c has not lapsed when notification of event E4 is received, the timer is again reset as indicated by 302d. At time T5, it is determined that the expiration time period has lapsed thereby causing the timer to expire. In other words, since time T4, at least the amount of time represented by the expiration time period 302d has lapsed without receiving an event notification. In accordance with an embodiment of a filtering service using techniques herein, the filtering service may receive event notifications E1-E4 as described above and filter out notification of events E1-E3 so that the subscriber is only informed regarding event notification E4 after the amount of time 302d has lapsed since time T4. Time T5 represents the point in time at which notification regarding E4 may be sent.

In one embodiment, events may be partitioned into one of multiple categories. Each such category may be further partitioned into one or more subcategories to form a categorical hierarchy. Thus, each event may be classified based on a combination of category and subcategory assigned to the event to identify the type of event. Although only two such levels of the categorical hierarchy are described herein, an embodiment may generally provide for any number of levels.

Figure 5:
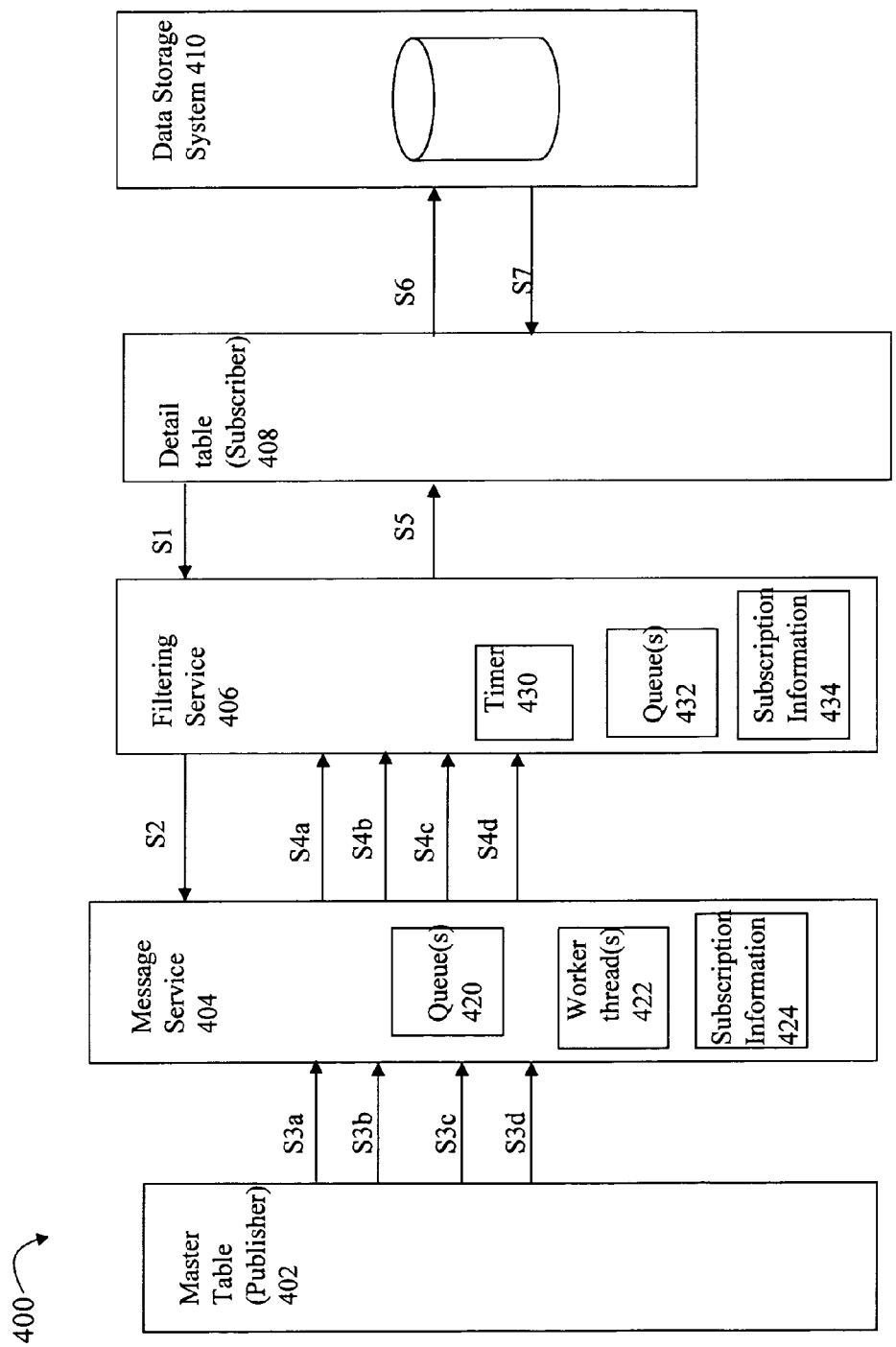
FIG. 5 is an example illustrating components and messages that may be exchanged in an embodiment in accordance with techniques herein.

Referring to FIG. 5, shown is an example of components that may be included in an embodiment in accordance with techniques herein. The example 400 includes the master table 402 as a publisher, message service 404, filtering service 406, detail table 408 as a subscriber, and data storage system 410. In one embodiment, elements 402, 404, 406 and 408 may be implemented as executable code executing on a computer system. Element 410 may represent a data storage system upon which data may be stored that is used to populate the UI display.

As a first step, the publisher 402 may provide a defined list of categories, and for each category, a list of one or more subcategories thereof. In this way, the publisher 402 identifies and characterizes the events about which it will publish notifications. The subscriber 408 may register S1 as a subscriber with the filtering service 406. As part of the registration process in one embodiment, the subscriber 408 may subscribe to receive notifications about selected events based on subscription criteria. The subscription criteria may identify one or more event categories and, optionally, one or more subcategories of each identified event category. Also, as part of the registration process in an embodiment, the subscriber may optionally specify an expiration time value for the timer 430 used in connection with filtering event notifications for this subscriber. If the subscriber does not provide such a value for the timer, the filtering service 406 may provide a default expiration time value for the timer. In connection with the registration process illustrated by S1, a subscription message containing the subscription criteria, expiration time, and the like, may be sent from the subscriber 408 to the filtering service 406. Information regarding the subscriber 408 and associated subscription criteria, expiration time value, and the like, may be stored as subscription information 434. The filtering service 406 may then subscribe S2 to the message service 404 on behalf of the subscriber 408 using the subscription criteria. The filtering service 406 may be characterized as a proxy for the subscriber 408 in connection with registering and receiving event notifications for the subscriber 408. In connection with the registration process illustrated by S2, a subscription message containing the subscription criteria may be sent from the filtering service 406 to the message service 404. Information regarding the filtering service 406 and associated subscription criteria as well as possibly other information may be stored as subscription information 424.

At some later point in time, one or more events may occur in connection with user interactions with the publisher 402. As a result in this example, the publisher 402 may publish 4 event notifications denoted S3a-S3d. The event notifications S3a-S3d may be messages sent to the message service 404 describing the event occurrence and may include, for example, the category and subcategory of the event which occurred, data or pointer to an object containing data related to the event, timestamp denoting when the event occurred, and the like. For example, if a user selection or data value was input using the UI, the event notification may include a payload with information representing the user selection, data value input, and the like. The event notifications received by the message service 404 may be placed in incoming queue 420 and subsequently processed by one or more worker threads 422. An event notification from the queue 420 may be retrieved and processed by having the worker thread provide the notification to registered subscribers of the message service 404 based on subscription information 424 for the registered subscribers. For example, the filtering service 406 may register on behalf of subscriber 408 to receive all events of a particular category. The worker thread may retrieve an event notification from the queue 420 and determine whether the event notification should be sent to the filtering service 406 based on matches between the subscription criteria for the registered filtering service 406 and category and subcategory specified for the event notification. In this example, all the event notifications S3a-S3d may have a same category that matches the subscription criteria for the filtering service 406. As a result, 4 messages denoted S4a-S4d corresponding to event notifications S3a-S3d may be sent to the filtering service 406. The incoming event notification messages S4a-S4d may be placed in a queue 432 of the filtering service 406 for processing. Each of the messages S4a-S4d may include information similar to that as described above for messages S3a-S3d.

At this point the filtering service 406 may perform processing in accordance filtering techniques as described herein for registered subscribers using subscription information 434. For example, assume that the event notification messages S4a-S4d correspond to those as described in connection with FIG. 4. The filtering service 406 may perform processing as described in connection with the flowchart of FIG. 3 so that only a single event notification denoted by S5 is sent to the subscriber 408. As described above, the single event notification may correspond to the fourth event notification received at time T4. The subscriber 408 may then perform processing in connection with the received event notification denoted by S5. For example, if the event notification is regarding a change to a field displayed in the master table, the event notification may indicate the field which has changed, include the changed or updated data value, a pointer to an object containing the updated data value, and the like. The subscriber 408 may then request S6 and receive S7 the corresponding data from the data storage system 410 to appropriately update its information as displayed in the UI. For example, if the event notification denoted by S5 indicates that a value of a name in the master table 402 was updated, in response the subscriber 408 may update a portion of its information to include updated personal information (e.g., address, phone number, and the like) for the named individual. The message sent in connection with S6 may identify the name of the individual as included in the event notification and may be used to retrieve the desired corresponding personal information from the data storage system 410 returned as a response message illustrated by S7.

In connection with the foregoing example of FIG. 5, the publisher 402 and subscriber (e.g., master and detail tables) may more generally represent two processes, modules, and the like, which may operate without any knowledge of the other and do not interact with each other directly. Rather, the subscriber is notified regarding events of interest through the use of the message service 404 and filtering service 406. In accordance with techniques herein, the filtering service 406 may hold the last received event meeting subscription criteria of the subscriber 408 until the time period has expired. Subsequently, the filtering service 406 sends notification regarding this last received event after the time period has expired.

It should be noted that foregoing is a simple example including only a single publisher and single subscriber and single category of events for purposes of illustration of techniques herein. It will be appreciated that an embodiment in accordance with techniques herein may have many publishers, subscribers, event categories, and the like. For example, the publisher may publish event notifications for multiple categories and, for each category, multiple subcategories. The subscriber 408 may subscribe to receive notifications regarding, for example, all events of one or more categories, a portion of events in one or more categories by registering to receive particular subcategories, and the like. In one embodiment, the filtering service 406 may have a different timer and value denoting the expiration time period for each subscription and associated subscriber.

An embodiment may also include other operations and methods than as described herein. For example, although only a subscription operation is described, an embodiment may also provide support for a complementary unsubscribe operation to unregister as a subscriber. The unsubscribe operation may be used in connection with the filtering service unsubscribing from the message service and with respect to a subscriber unsubscribing from the filtering service.

Figure 6:
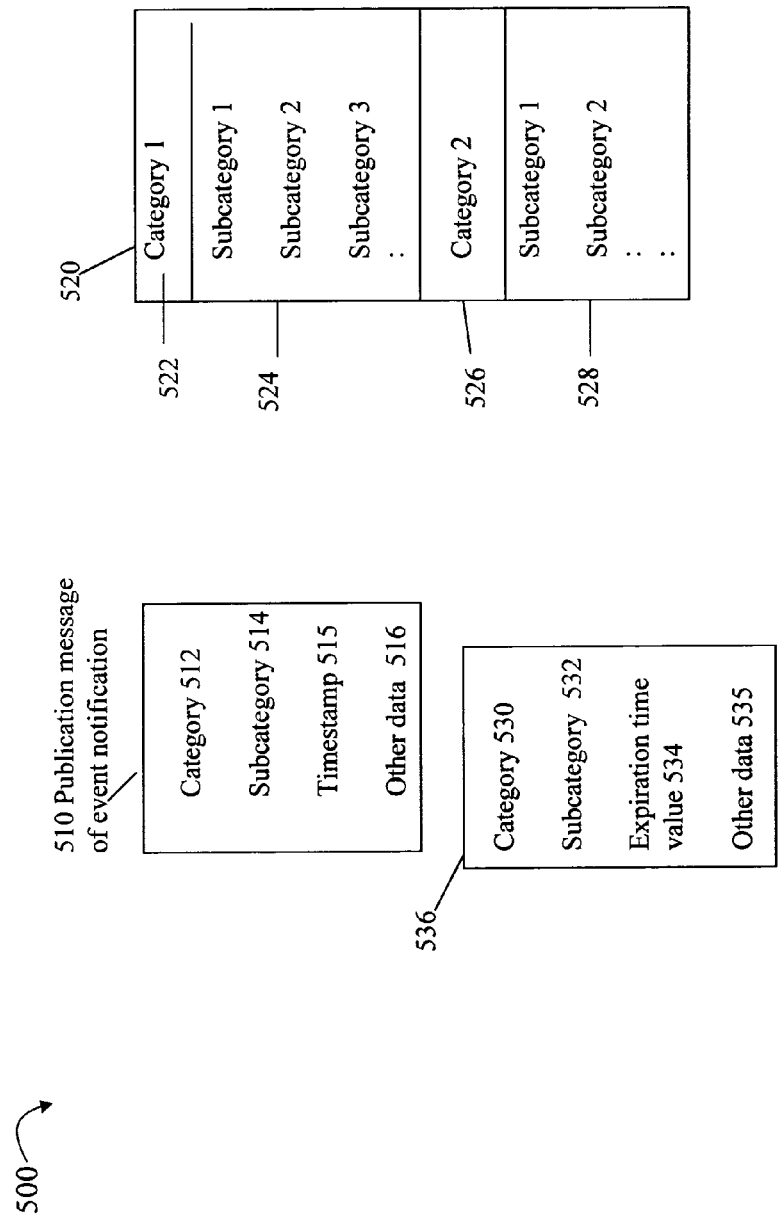
FIG. 6 is an example of messages and categories included in a hierarchy as may be used in an embodiment in accordance with techniques herein.

Referring to FIG. 6, shown is an example of messages and categories as may be used in an embodiment in accordance with techniques herein. Element 510 represents information as may be included in a publication message of an event notification such as sent by the publisher to the message service. The publication message 510 may include a category 512 and subcategory classifying the event that occurred, a timestamp 515 at which the event occurred, and other data 516. Element 536 represents information as may be included in a message to register as a subscriber (e.g., such as sent by the filtering service to the message service, and from the subscriber to the filtering service). The subscription registration message 536 may include one or more categories 530, one or more subcategories 532 for each category, an expiration time value 534, and other data 535.

Element 520 represents a hierarchy of categories and subcategories as may be provided collectively for all publishers in an embodiment. The hierarchy 520 may include multiple categories and, for each such category, multiple subcategories. For example, category 522 includes subcategories 524 and category 526 includes subcategories 528. Element 520 also represents the categories and subcategories for which a subscriber and a filtering service may register.

Figure 7:
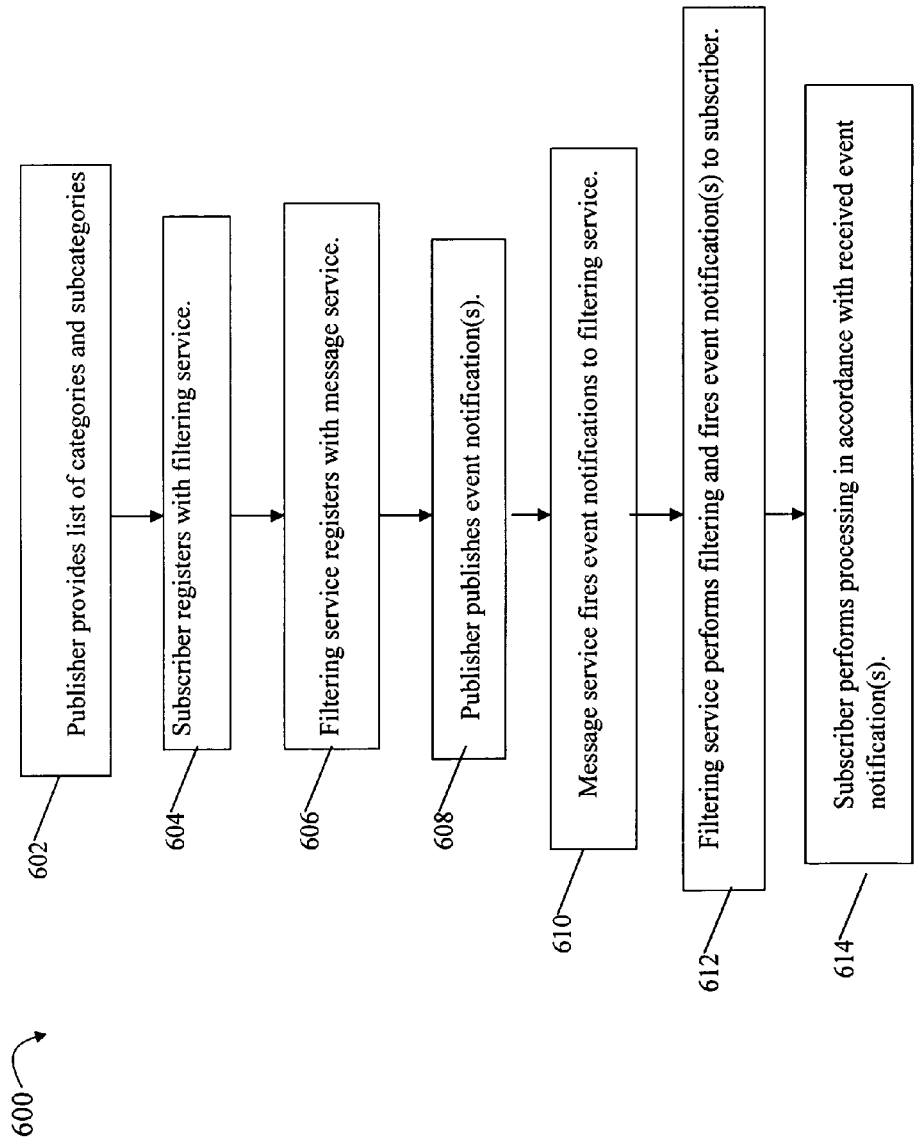

Referring to FIG. 7, shown is a flowchart of processing steps as may be performed in an embodiment in accordance with techniques herein. The steps of 600 summarize processing described above. At step 602, the publisher provides a list of categories and (optionally) subcategories of events for which notifications can be published. At step 604, the subscriber registers with the filtering service. At step 606, the filtering service registers with the message service. At step 608, the publisher publishes one or more event notifications which are sent to the message service. At step 610, the message service fires event notifications to the filtering service based on subscription registrations. At step 612, the filtering service performs filtering of the event notifications in accordance with techniques herein and fires one or more event notifications to the subscriber. At step 614, the subscriber performs processing in accordance with received event notification(s) from the filtering service.

An embodiment may implement the techniques herein using code executed by a processor. For example, an embodiment may implement the techniques herein using code which is executed by a processor of a computer system. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for event notification comprising:
   receiving, using a processor, a first notification at a filtering service module about a first event;
   setting, using a processor, a timer to an amount of time in response to receiving the first notification about the first event;
   waiting until an earlier occurrence of either receiving, by the filtering service module, a second notification of a second event prior to said amount of time elapsing, or expiration of said timer indicating that said amount of time has elapsed prior to the filtering service module receiving said second notification;
   determining, using a processor, whether said amount of time has elapsed prior to receiving said second notification by the filtering service module or whether said second notification has been received by the filtering service module prior to said amount of time elapsing, wherein if said amount of time has elapsed prior to the filtering service module receiving the second notification, notification of said first event is provided by the filtering service module to a subscriber, and otherwise, if said second notification has been received by the filtering service module prior to said amount of time elapsing, resetting said timer and waiting for an occurrence of either the filtering service module receiving a next notification of an event or expiration of said timer indicating that said amount of time has elapsed since the filtering service module received a notification of an event occurrence, and
   wherein a plurality of notifications about a plurality of events are received by the filtering service module, a temporal distance between any two consecutive ones of the plurality of notifications received by the filtering service module is less than said amount of time, and said amount of time elapses after the filtering service module receives a last one of the plurality of notifications, the method further comprising:
   firing, using a processor, an event notification from the filtering service module to said subscriber about only the last one of the plurality of notifications received by the filtering service module after said amount of time elapses without the filtering service module receiving a next notification of an event.

2. The method of claim 1, wherein said first event and said second event are associated with the same subscription criteria.

3. The method of claim 2, wherein said subscription criteria includes a category identifying an event category.

4. The method of claim 3, wherein said subscription criteria includes a plurality of subcategories for said category.

5. The method of claim 1, wherein a publisher publishes said first notification and said second notification.

6. The method of claim 1, wherein said first event has a first category and notification of said first event is provided to said subscriber previously registered to receive notifications about events of said first category.

7. The method of claim 6, wherein said first event has a subcategory and notification of said first event is provided to said subscriber previously registered to receive notifications about events having said first category and said subcategory.

8. A system comprising a non-transitory computer readable medium including code stored thereon which, when executed, function as:
   a publisher of event notifications;
   a message service that receives said event notifications from said publisher;

a filtering service which receives said event notifications from said message service, said filtering service having a timer indicating an amount of time;

a subscriber which receives a portion of said event notifications from said filtering service in accordance with subscription criteria, and wherein said filtering service further comprises code for:

receiving a first event notification at said filtering service about a first event in accordance with said subscription criteria;

setting said timer to said amount of time in response to receiving the first event notification about the first event;

waiting until an earlier occurrence of either receiving, by the filtering service, a second event notification of a second event in accordance with said subscription criteria prior to said amount of time elapsing or expiration of said timer indicating that said amount of time has elapsed prior to the filtering service receiving the second event notification;

determining whether said amount of time has elapsed prior to the filtering service receiving said second event notification or whether said second event notification has been received by the filtering service prior to said amount of time elapsing, wherein if said amount of time has elapsed prior to the filtering service receiving the second event notification, notification of said first event is provided by the filtering service to said subscriber, and otherwise, if said second event notification has been received by the filtering service prior to said amount of time elapsing, resetting said timer and waiting for an occurrence of either the filtering service receiving a next notification of an event or expiration of said timer indicating that said amount of time has elapsed since the filtering service received a notification of an event occurrence, and wherein a plurality of notifications about a plurality of events having said subscription criteria are received by the filtering service, a temporal distance between any two consecutive ones of the plurality of notifications received by the filtering service is less than said amount of time, and said amount of time elapses after the filtering service receives a last one of the plurality of notifications, the filtering service further comprising code for:

firing an event notification from the filtering service to said subscriber about only the last one of the plurality of notifications received by the filtering service after said amount of time elapses without the filtering service receiving a next notification of an event.

9. The system of claim 8, wherein said subscription criteria includes a category indicating a category of events.

10. The system of claim 9, wherein said category is associated with one or more subcategories and said subscription criteria includes one or more of said subcategories.

11. The system of claim 8, wherein said subscriber subscribes to said filtering service and said filtering service subscribes to said message service on behalf of said subscriber.

12. The system of claim 11, wherein, when said subscriber subscribes to said filtering service, said subscriber specifies said subscription criteria identifying events about which said subscriber is to be notified.

13. The system of claim 12, wherein, when said subscriber subscribes to said filtering service, said subscriber specifies said amount of time for said timer.

14. A non-transitory computer readable medium comprising code stored thereon for event notification, the non-transitory computer readable medium comprising code for:

receiving, using a processor, a first notification at a filtering service module about a first event;

setting, using a processor, a timer to an amount of time in response to receiving the first notification about the first event;

waiting until an earlier occurrence of either receiving, by the filtering service module, a second notification of a second event prior to said amount of time elapsing, or expiration of said timer indicating that said amount of time has elapsed prior to the filtering service module receiving said second notification;

determining, using a processor, whether said amount of time has elapsed prior to receiving said second notification by the filtering service module or whether said second notification has been received by the filtering service module prior to said amount of time elapsing, wherein if said amount of time has elapsed prior to the filtering service module receiving the second notification, notification of said first event is provided by the filtering service module to a subscriber, and otherwise, if said second notification has been received by the filtering service module prior to said amount of time elapsing, resetting said timer and waiting for an occurrence of either the filtering service module receiving a next notification of an event or expiration of said timer indicating that said amount of time has elapsed since the filtering service module received a notification of an event occurrence, and wherein a plurality of notifications about a plurality of events are received by the filtering service module, a temporal distance between any two consecutive ones of the plurality of notifications received by the filtering service module is less than said amount of time, and said amount of time elapses after the filtering service module receives a last one of the plurality of notifications, the method further comprising:

firing, using a processor, an event notification from the filtering service module to said subscriber about only the last one of the plurality of notifications received by the filtering service module after said amount of time elapses without the filtering service module receiving a next notification of an event.

15. The non-transitory computer readable medium of claim 14, wherein each notification in said plurality has an associated category and subcategory which matches subscription criteria of a subscriber.

16. The non-transitory computer readable medium of claim 14, wherein said amount of time is a time period specified in connection with a subscription registration or otherwise provided using a default value.

* * * * *